United States Patent Office 2,971,299
Patented Feb. 14, 1961

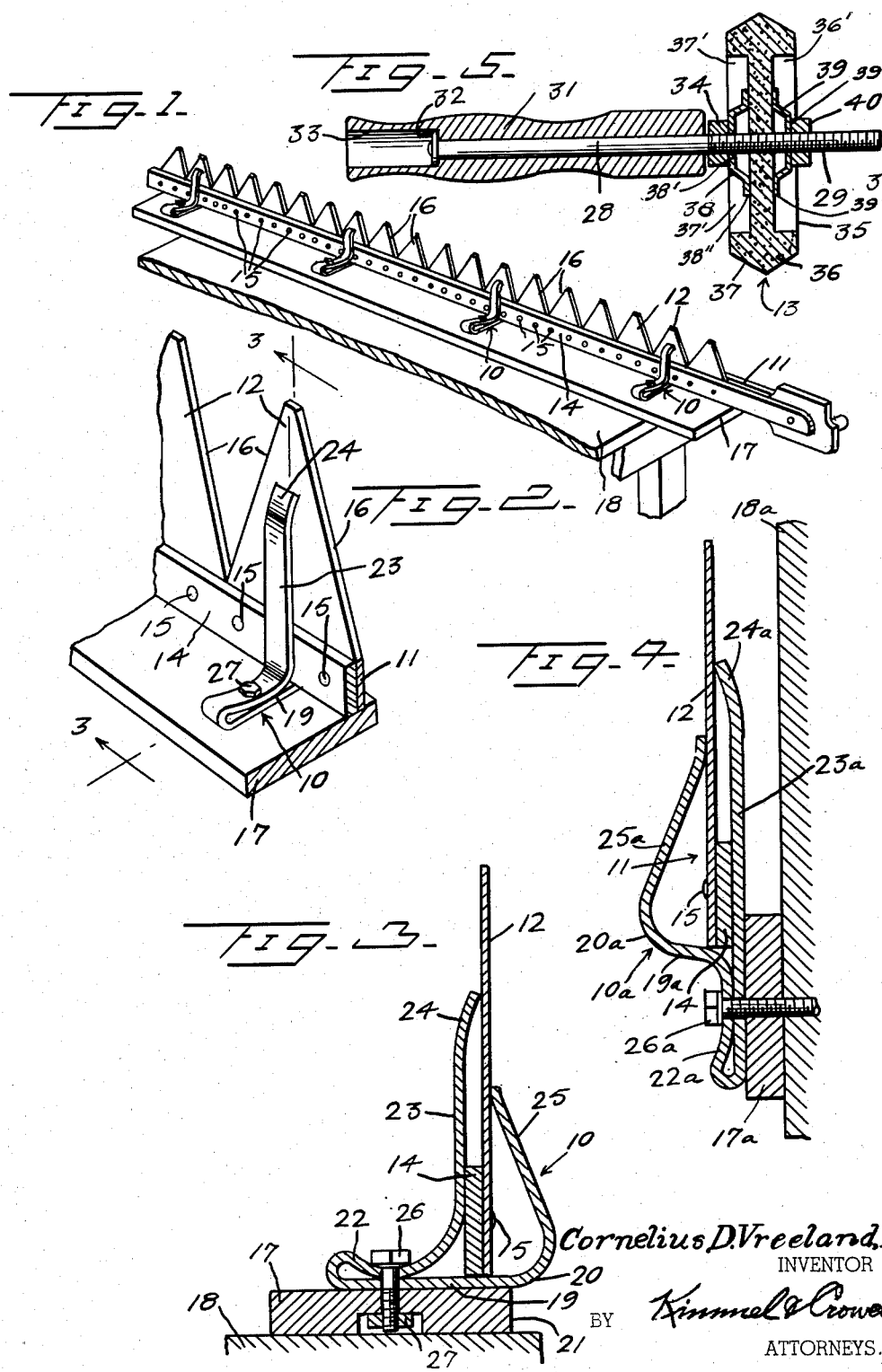

2,971,299

SICKLE AND MOWER KNIFE SHARPENER ATTACHMENT FOR ELECTRIC DRILLS

Cornelius D. Vreeland III, Chester, Mass.
(R.F.D. 2, Middlefield, Mass.)

Filed June 19, 1958, Ser. No. 743,077

1 Claim. (Cl. 51—173)

The present invention relates primarily to a hand-mandrel device for accommodating a grinding wheel for sharpening and grinding sickle and mower blades and which can be chucked to a small hand drill, such as for example, a common type portable electric drill which is usually part of the equipment possessed by farmers and other persons.

Inclusively, the invention also contemplates a novel supporting bracket for holding a sickle bar or mower blade in position for sharpening or grinding the same and in which the sickle bar or mower blade can be inserted and removed by a quick and easy hand operation.

It will be seen from the appended drawings and the description forming a part hereof that there is provided an inexpensive, convenient, easily operated, space conserving means for supporting and sharpening sickle bars, mower blades and the like, in a convenient clamp set-up wherein the operator has a full and unobstructed view of the grinding operation during the performance thereof.

Another object of the invention is to provide in a mower knife sharpener of the class described above a sickle bar support into which the sickle bar can be inserted and removed by a simple hand operation.

A still further object of the invention is to provide a mower knife sharpener of the class described above which is inexpensive to manufacture, simple to use, and which can be attached to a wall or bench without requiring special mounting brackets and the like.

Other objects and advantages will become apparent in the following specification when considered in the light of the attached drawings, in which:

Figure 1 is a fragmentary perspective view of the invention with a sickle bar supported therein.

Figure 2 is an enlarged fragmentary perspective view of one of the supports with the sickle bar engaged therein.

Figure 3 is a vertical sectional view taken along the line 3—3 of Figure 2, looking in the direction of the arrows.

Figure 4 is a view similar to Figure 3 of a modified form of the invention.

Figure 5 is a longitudinal sectional view of the hand grinding tool used to sharpen the mower blades.

Referring now to the drawings in detail wherein like reference characters indicate like parts throughout the several figures, the reference numeral 10 indicates generally a support for clamping a sickle bar 11 in upright position to permit the cutter blades 12 thereof to be sharpened by a hand held grinding tool generally indicated at 13.

The sickle bar 11 is of conventional construction and includes a generally rectangular elongated cutter bar 14 to which the cutter blades 12 are secured by rivets 15 in a conventional manner.

The outwardly converging edges 16 are sharpened by the grinding tool 13 in the manner described below.

An elongated board 17 is supported on a table or bench 18 and can be clamped or bolted thereto if desired. The support brackets 10 are arranged in spaced relation along the board 17 and comprises a horizontal flat portion 19 which extends transversely of the board 17 in engagement therewith with one end 20 thereof extending beyond the side edge 21 of the board 17.

The flat portion 19 of the bracket support 10 has a reverted portion 22 integrally connected to the end of the flat portion 19 oppositely of the end 20. A generally flat perpendicularly extending bar 23 is integrally joined to the reverted portion 22 at the end thereof opposite its connection to the horizontal portion 19. The bar 23 has an arcuately offset terminal end 24 extending in the direction of the end 20 of the flat portion 19.

An upstanding clamping bar 25 is integrally joined to the end 20 of the flat portion 19 and is arranged to slope toward the bar 23 terminating below the arcuate offset end 24 thereof. The upstanding bar 23 and the clamping bar 25 are formed of resilient material and are biased toward each other to clamp a sickle bar 11 placed therebetween.

In engaging the sickle bar 11 in the support brackets 10, the lower edge of the cutter bar 14 is engaged between the upper end of the clamping bar 25 and the upright bar 23, and is then pressed downwardly into engagement with the horizontal portion 19, as seen in Figure 3, while the grinding operation is carried out thereon. A bolt 26 extends through the reverted portion 22 and the flat portion 19 as well as the board 17 and is held in place by a nut 27 to secure the support bracket 10 to the board 17.

In Figure 4 a modified form of the invention is illustrated wherein the support bracket 10a is supported on a wall 18a in spaced relation along a horizontally extending baseboard 17a engaged against the wall 18a.

The support bracket 10a includes a flat upright bar 23a engaged against the outer face of the baseboard 17a and having an outward arcuately offset terminal end 24a at the upper end thereof. A reverted portion 22a is integrally joined to the lower end of the bar 23a and extends upwardly therewith.

The reverted portion 22a has an outwardly extending offset portion 19a integrally formed on the upper end thereof and having at its outer end 20a a clamping bar 25a integrally joined thereto and extending upwardly therefrom sloping inwardly toward the upright bar 23a and terminating at a point spaced below the arcuately offset terminal end portion 24a.

A bolt 26a extends through the reverted portion 22a, the upright bar 23a, the board 17a, into the wall 18a, to secure the support bracket 10a to the board 17a and the wall 18a. The sickle bar 11 is engaged with the support bracket 10a between the resilient bars 23a, 25a in the same manner as it is engaged with the support bracket 10.

I will now describe the hand operated grinding tool shown in Figure 5 of the drawings and which comprises an essential and most important part of my invention.

The edges 16 of the cutter blades 12 are sharpened by a hand grinding tool 13 which includes a shaft 28 threaded at 29 adjacent one end thereof and having a reduced extension 30 formed on the threaded end 29. A handle 31 is journalled on the shaft 28 opposite the reduced extension 30. The shaft 28 has a head 32 on the end thereof opposite the threaded end 29 and the handle 31 has a counterbore 33 in which the head 32 is seated.

A nut 34 is threaded on the shaft 28 and a grinding wheel 35 having opposed conical faces 36, 37 and counter sunk central portions 36' and 37', is positioned on the threaded portion 29 of the shaft 28 between a pair of dished washers 38, 39 in engagement with the nut 34. Each washer includes a flat outer surface 38', 39' and an annular flange 38'', 39'', engaging the opposite faces of the grinding wheel within the counter sunk central recess, with the flat outer surfaces lying wholly within the recesses. A nut 40 is threaded on the threaded portion 29 of the shaft 28 to clamp the grinding wheel 35 to the shaft 28.

The reduced end portion 30 of the shaft 28 is chucked into an electric drill (not shown) and by holding the electric drill and handle 31, the grinding wheel 35 is rotated and brought into engagement with the edges 16 of the blades 12 so that they may be sharpened thereby.

It will be noted from the foregoing description, that anyone having, for example, an ordinary ¼ inch type portable electric drill, and having my aforedescribed grinding tool attachment is fully equipped to very quickly and easily sharpen sickle bars or mower blades and to at all times be in a position to see where he is grinding.

It should be noted that the sickle bar 11 remains stationary during the grinding operation on each of the cutter blades 12 while the grinding tool 13 is moved from one edge 16 to the next to complete the sharpening operation.

Having thus described the preferred embodiments of the invention, it should be understood that numerous structural modifications and adaptations may be resorted to without departing from the scope of the appended claim.

What is claimed is:

A hand grinding tool for sharpening sickle bars, comprising a handle having a bore therethrough and an enlarged co-axial counter bore at one end, a shaft rotatably supported in said bore and having a threaded end portion extending outwardly from said bore, the other end of said shaft being enlarged and surrounding a washer seating in said counter bore to prevent longitudinal displacement of said shaft, a first clamping nut on said shaft, a first dished clamping washer positioned on said shaft outwardly of said first clamping nut, said first clamping washer having a flat outer surface engaging said first clamping nut and an annular flange about its rim, a grinding wheel having a rim formed with opposed conical outer faces and oppositely positioned counter sunk central portions on said shaft, said flange of said first clamping washer engaging the face of said grinding wheel in the adjacent counter sunk center portion, with the flat outer surface of said washer lying wholly within said counter sunk center portion, a second dished clamping washer having a flat outer surface and an annular flange mounted on said shaft in opposed relation to said first clamping washer, said last-mentioned annular flange engaging the other face of said grinding wheel in its counter sunk center portion, and having its flat surface lying wholly within said last-mentioned counter sunk center portion, and a second clamping nut threaded on said threaded stem and seating against the flat outer surface of said second clamping washer.

References Cited in the file of this patent
UNITED STATES PATENTS

| | | |
|---|---|---|
| 419,468 | Neale | Jan. 14, 1890 |
| 512,740 | Ogle et al. | Jan. 16, 1894 |
| 805,857 | Jankoski | Nov. 28, 1905 |
| 1,088,990 | Hoffman | Mar. 3, 1914 |
| 1,159,108 | Schwartz | Nov. 2, 1915 |
| 1,405,335 | Rosebush | Jan. 31, 1922 |
| 1,734,427 | Gray | Nov. 5, 1929 |
| 2,213,065 | Danback | Aug. 27, 1940 |
| 2,755,605 | Simmons | July 24, 1956 |